(12) United States Patent
Ahiko et al.

(10) Patent No.: US 7,050,288 B2
(45) Date of Patent: May 23, 2006

(54) LAMINATED CERAMIC CAPACITOR

(75) Inventors: Taisuke Ahiko, Tokyo (JP); Sunao Masuda, Tokyo (JP); Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/058,243

(22) Filed: Feb. 16, 2005

(65) Prior Publication Data

US 2005/0201040 A1    Sep. 15, 2005

(30) Foreign Application Priority Data

Mar. 11, 2004  (JP) .............................. 2004-069490

(51) Int. Cl.
*H01G 4/005* (2006.01)
(52) U.S. Cl. ................. 361/303; 361/306.1; 361/306.3
(58) Field of Classification Search ................ 361/303, 361/306.1, 306.3, 307, 308.1, 309, 321.1, 361/321.2, 321.3, 301.1
See application file for complete search history.

(56) References Cited

U.S. PATENT DOCUMENTS 5,880,925 A * 3/1999 DuPre et al. ................ 361/303
6,072,687 A * 6/2000 Naito et al. .................. 361/303
6,243,253 B1 * 6/2001 DuPre et al. ............. 361/306.3
6,292,351 B1 * 9/2001 Ahiko et al. ............. 361/306.3
6,606,237 B1 * 8/2003 Naito et al. .............. 361/306.3
6,621,682 B1 * 9/2003 Takakuwa et al. ....... 361/306.3
6,657,848 B1 * 12/2003 Togashi et al. .......... 361/306.3

FOREIGN PATENT DOCUMENTS

| JP | 2002-184647 | 6/2002 |
| JP | 2002-305127 | 10/2002 |
| JP | 2003-31435 | 1/2003 |

* cited by examiner

*Primary Examiner*—Anthony Dinkins
(74) *Attorney, Agent, or Firm*—Oblon, Spivak, McClelland, Maier & Neustadt, P.C.

(57) ABSTRACT

Internal electrodes A1 to D1 and A2 to D2 are laid in layers at spaces in the direction of thickness of a ceramic body 1. Lead electrodes a1 to d1 and a2 to d2 are led out to a side face to form lead portions. Dummy electrodes 51 to 58 have one-side ends led out to a side face to form lead portions in layers provided with the internal electrodes A1 to D1 and A2 to D2. The lead portion of a lead electrode a1 to d1 or a2 to d2 of each layer is superposed over the lead portion of a dummy electrode 51 to 58 belonging to another layer in the direction of thickness.

10 Claims, 10 Drawing Sheets

LAMINATED CERAMIC CAPACITOR

TECHNICAL FIELD

The present invention relates to a laminated ceramic capacitor.

BACKGROUND OF THE INVENTION

As a laminated ceramic capacitor, there is known a laminated ceramic capacitor having a plurality of terminal pairs, for example. A ceramic capacitor having a plurality of terminal pairs is used for decoupling a central processing unit (CPU) of a personal computer, and the like. For example, Patent Literature 1 (Japanese published patent application No. 2002-184647) has disclosed an internal electrode pattern of a laminated ceramic capacitor having eight terminals and a method for manufacturing the same.

And Patent Literature 2 (Japanese published patent application No. 2003-31435) has disclosed a laminated ceramic capacitor having eight terminals, being provided with a filling layer (dummy electrode) in a part having no lead electrode provided in it in order to prevent a ceramic dielectric layer from being depressed.

While a conventional laminated ceramic capacitor having no plural terminal pairs has an internal electrode exposed at a side face of a ceramic body on every second layer, a laminated ceramic capacitor having a plurality of terminal pairs, for example, a laminated ceramic capacitor having eight terminals has an internal electrode exposed at a side of a ceramic body on every eighth layer.

Therefore, a laminated ceramic capacitor having a plurality of terminal pairs has had a problem that defective connections occur frequently between internal and terminal electrodes and the yield rate of it is worsened due to a smaller number of internal electrodes exposed at a side of a ceramic body in comparison with a conventional laminated ceramic capacitor.

Further, with the miniaturization of a laminated ceramic capacitor, since a part to be exposed at a side of a ceramic body and connected to a terminal electrode is made smaller, a conventional laminated ceramic capacitor also has had a problem that defective connection to a terminal electrode occurs frequently.

SUMMARY OF THE INVENTION

An object of the present invention is to provide a laminated ceramic capacitor being capable of reducing defective connections between internal electrodes and terminal electrodes.

Another object of the present invention is to provide a laminated ceramic capacitor being capable of reducing occurrence of delamination.

Yet another object of the present invention is to provide a laminated ceramic capacitor being capable of reducing occurrence of cracks.

Still another object of the present invention is to provide a laminated ceramic capacitor being better in yield rate.

In order to achieve the above-mentioned objects, a laminated ceramic capacitor according to the present invention comprises a ceramic body, internal electrodes and dummy electrodes.

The internal electrodes are plural in number, each of them includes a facing electrode and a lead electrode, and these internal electrodes are laid in layers at spaces in the direction of thickness of the ceramic body.

A facing electrode is an electrode for acquiring a capacitance.

A lead electrode has one end connected with a facing electrode and the other end led out at a side of the ceramic body to form a lead portion.

A dummy electrode is provided separately from an internal electrode in a layer where the internal electrode and is led out to a side face of the ceramic body to form a lead portion.

The lead portion of a lead electrode of each layer is superposed over the lead portion of a dummy electrode belonging to another layer in the direction of thickness.

A laminated ceramic capacitor according to the present invention described above comprises internal electrodes. The internal electrodes are plural in number, each of them includes a facing electrode and a lead electrode, and these internal electrodes are laid in layers at spaces in the direction of thickness of a ceramic body. A facing electrode is an electrode for acquiring a capacitance. A lead electrode one end connected with a facing electrode and the other end led out to a side of the ceramic body to form a lead portion. The above-described structure connects a lead portion of a lead electrode led out to a side face of the ceramic body to a terminal electrode and thereby forms a laminated ceramic capacitor.

A laminated ceramic capacitor according to the present invention comprises dummy electrodes. Since a dummy electrode is provided in a layer where an internal electrode is provided, the difference in level caused by the raised internal electrode is reduced by the dummy electrode. Due to this, a strain in a ceramic body or an internal electrode is reduced and occurrence of delamination or cracks is reduced and thereby the yield rate is improved.

For example, a lead electrode of each layer is provided so as not to be superposed over at least one of lead electrodes belonging to other layers in the direction of thickness. Due to this, by providing a dummy electrode at a location being provided with no lead electrode and superposed over at least one of lead electrodes belonging to other layers, the difference in level caused by a raised lead electrode is reduced and the occurrence of delamination or cracks results in being reduced. Preferably every layer provided with a lead electrode has the above-described structure.

And since a dummy electrode is provided separately from an internal electrode, it has no influence on the electric characteristics.

Further, in a dummy electrode, one end of it is led out at a side face to form a lead portion. The lead portion of a lead electrode of each layer is superposed over the lead portion of at least one of dummy electrodes belonging to other layers. Due to this, lead portions of dummy electrodes and lead portions of lead electrodes come to be respectively aligned with one another at a side of a ceramic body along the direction of thickness.

Due to this, terminal electrodes formed along the direction of thickness can be connected to the lead electrodes and dummy electrodes aligned along the direction of thickness. Thanks to this, a laminated ceramic capacitor according to the present invention is improved in joining strength between internal electrodes and terminal electrodes by joining strength between dummy electrodes and terminal electrodes, and as a result the connection state is made better.

On the other hand, since a laminated ceramic capacitor disclosed in Patent Literature 2 for example has dummy electrodes not reaching an end of a ceramic body, in a capacitor having eight lead electrodes a lead electrode exposed at a side face of a ceramic body has a gap formed by seven layers in the direction of thickness and therefore is liable to make a defective connection with a terminal electrode.

Other features and their actions and effects of the present invention are described in more detail by means of embodiments with reference to the accompanying drawings.

DESCRIPTIONS OF THE PREFERRED EMBODIMENTS

A laminated ceramic capacitor illustrated is a laminated ceramic capacitor having a plurality of terminal pairs and is used in CPU decoupling and the like, for example.

As shown in FIGS. 1 to 5, a laminated ceramic capacitor comprises a ceramic body 1, internal electrodes A1 to D1 and A2 to D2, dummy electrodes 51 to 58, and terminal electrodes 21 to 28. The ceramic body 1 includes a ceramic dielectric.

Figure 3:
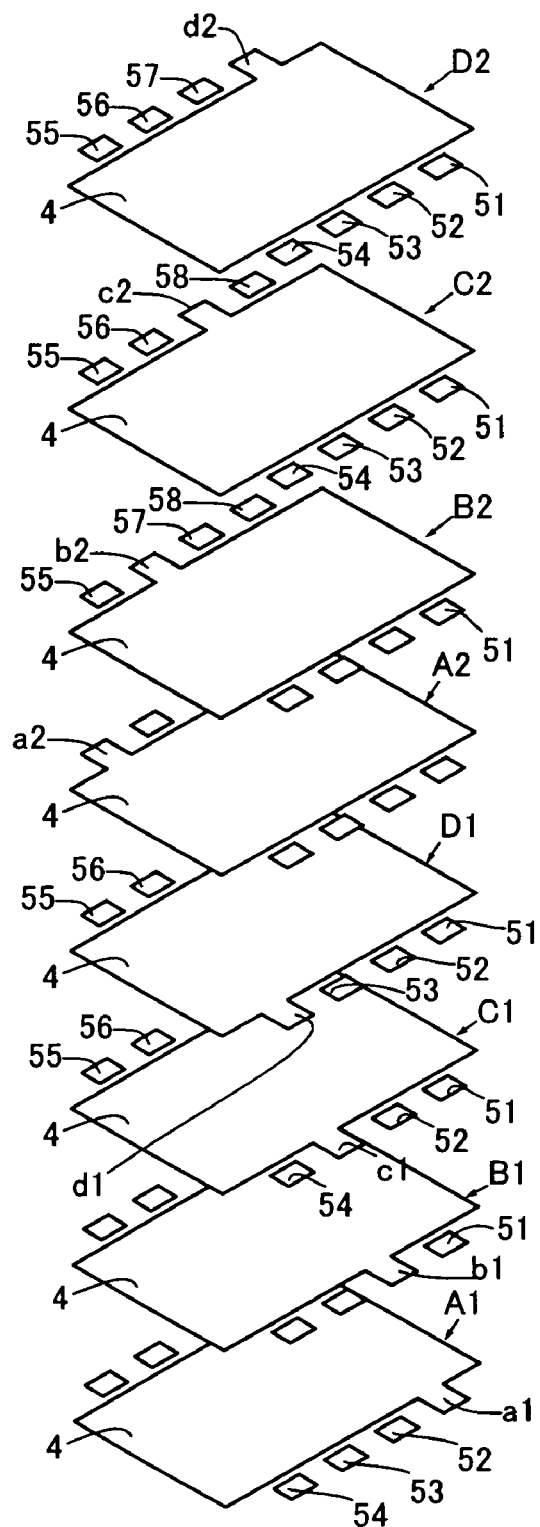
FIG. 3 is an exploded perspective view showing the structure of internal electrodes and dummy electrodes of the laminated ceramic capacitor shown in FIGS. 1 and 2.
Figure 4:
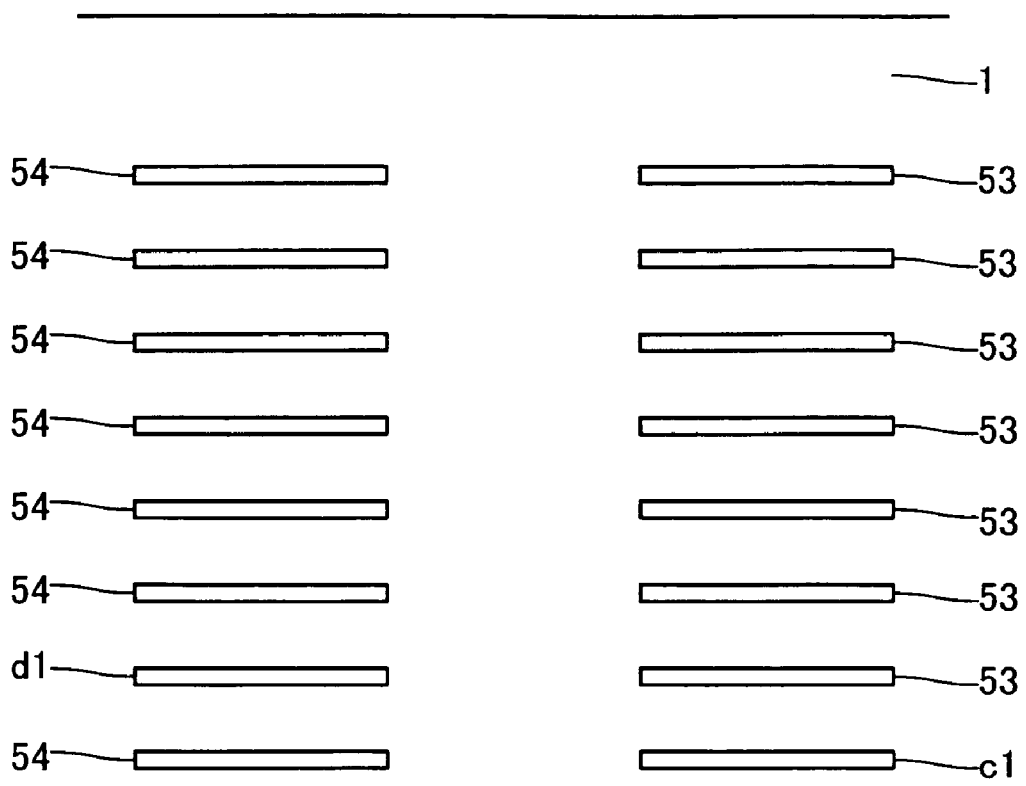
FIG. 4 is a magnified right side view of the laminated ceramic capacitor shown in FIG. 2.
Figure 5:
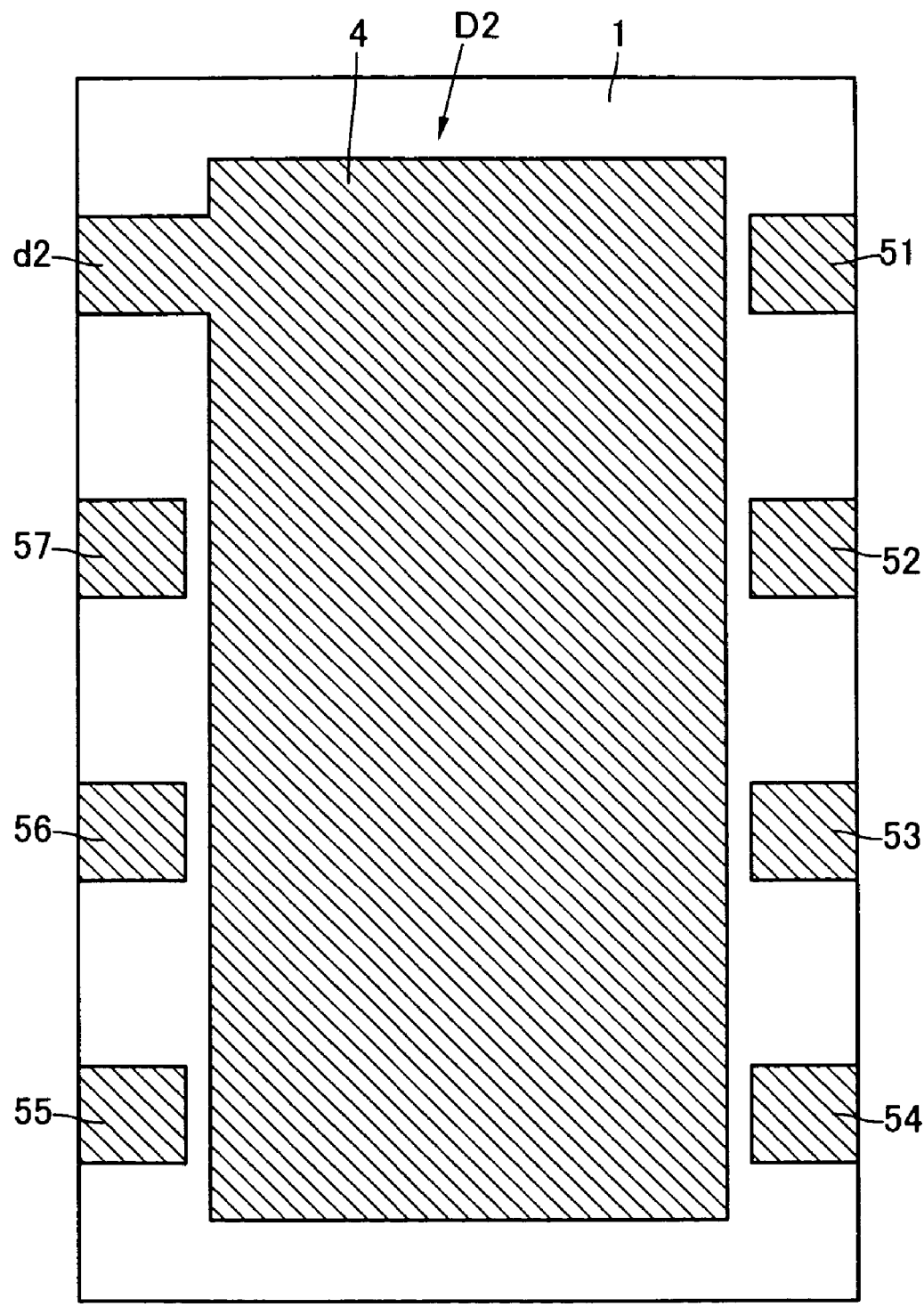
FIG. 5 is an opened-up plan view of the laminated ceramic capacitor shown in FIGS. 1 and 2.

In FIG. 3, the internal electrodes A1 to D1 and A2 to D2 each comprise one of lead electrodes a1 to d1 and a2 to d2 and a facing electrode 4, and are laid in layers at spaces in the direction of thickness of the ceramic body 1. The internal electrodes A1 and A2, B1 and B2, C1 and C2, and D1 and D2 respectively have the same shape as each other in pairs, and are turned from each other by 180 degrees in lamination.

In FIG. 3, the internal electrodes A1 to D1 and A2 to D2 are laminated one over another with ceramic body 1 between them in order of A1, B1, C1, D1, A2, B2, C2 and D2 from below. The shapes and the number of layers of internal electrodes are optional. Two or more internal electrodes may be provided in one lamination layer.

The facing electrodes 4 are electrodes for acquiring a capacitance and face each other in lamination. The lead electrodes a1 to d1 and a2 to d2 each have one end connected to a facing electrode 4 and the other end led out to a side face of the ceramic body 1 to form a lead portion. The side face may be one of the right side, left side, front and back faces, and two or more side faces may be provided. The number of lead electrodes exposed at a side face of the ceramic body 1 may be one, two or more in one lamination layer. Two or more lead electrodes may be provided in one internal electrode.

In the figure, lead electrodes a1 to d1 are led out to the right side face, and lead electrodes a2 to d2 are led out to the left side face. In an embodiment, lead electrodes a1 to d1 and a2 to d2 are provided so as not to be superposed over lead electrodes a1 to d1 and a2 to d2 belonging to another layer in the direction of thickness.

The dummy electrodes 51 to 58 are respectively provided separately by spaces from the internal electrodes A1 to D1 and A2 to D2 in layers provided with the internal electrodes A1 to D1 and A2 to D2. One end of each of the dummy electrodes 51 to 58 is led out to a side face to form a lead portion, and the dummy electrodes 51 to 58 of the respective layers are respectively superposed one over another in the direction of thickness. The widths of parts of the dummy electrodes 51 to 58 led out to a side face respectively correspond to the widths of parts of the internal electrodes a1 to d1 and a2 to d2 led out to a side face.

The dummy electrodes 51 to 58 are provided at locations of each layer in which the lead electrodes a1 to d1 and a2 to d2 are not provided and which are superposed over the lead electrodes a1 to d1 and a2 to d2 belonging to other layers in the direction of thickness. And the lead portion of the lead electrode a1 to d1 or a2 to d2 in each layer is superposed over the lead portion of the dummy electrode 51 to 58 belonging to another layer in the direction of thickness.

For example, in FIG. 3, dummy electrodes 51, 52 and 54 to 58 are provided in a layer provided with internal electrode C1, dummy electrodes 51 to 53 and 55 to 58 are provided in a layer provided with internal electrode D1, dummy electrodes 52 to 58 are provided in a layer provided with internal electrode A1, dummy electrodes 51 and 53 to 58 are provided in a layer provided with internal electrode B1, dummy electrodes 51 to 54 and 56 to 58 are provided in a layer provided with internal electrode A2, dummy electrodes 51 to 55, 57 and 58 are provided in a layer provided with internal electrode B2, dummy electrodes 51 to 56 and 58 are provided in a layer provided with internal electrode C2, and dummy electrodes 51 to 57 are provided in a layer provided with internal electrode D2.

Referring to FIG. 1 again, terminal electrodes 21 to 24 are connected to lead electrodes a1 to d1 and dummy electrodes 51 to 54 on the right side, and terminal electrodes 25 to 28 are connected to lead electrodes a2 to d2 and dummy electrodes 55 to 58 on the left side.

A laminated ceramic capacitor according to this embodiment described above comprises internal electrodes A1 to D1 and A2 to D2. The internal electrodes A1 to D1 and A2 to D2 are plural in number, and each of them includes a facing electrode 4 and a lead electrode a1 to d1 or a2 to d2, and they are laid in layers at spaces in the direction of thickness of a ceramic body 1. The facing electrode 4 is an electrode for acquiring a capacitance. Each of the lead electrodes a1 to d1 and a2 to d2 has one end connected to a facing electrode 4 and the other end led out to a side face of a ceramic body 1 to form a lead portion. Due to this, the lead portions of the lead electrodes a1 to d1 and a2 to d2 led out to a side face of the ceramic body 1 are connected to terminal electrodes for example to form a laminated ceramic capacitor.

A laminated ceramic capacitor according to the present invention comprises dummy electrodes 51 to 58. Since dummy electrodes 51 to 58 are provided separately from internal electrode A1 to D1 or A2 to D2 in a layer where the internal electrode A1 to D1 or A2 to D2 is provided, the difference in level caused by a raised internal electrode is reduced by the dummy electrodes 51 to 58. Due to this, a strain in ceramic body 1 or internal electrode A1 to D1 or A2 to D2 is reduced and the occurrence of delamination or cracks is reduced and thereby the yield rate is improved.

For example, a lead electrode a1 to d1 or a2 to d2 of each layer is provided so as not to be superposed over lead electrodes a1 to d1 and a2 to d2 belonging to other layers in the direction of thickness. Due to this, by providing dummy electrodes 51 to 58 at locations being not provided with lead electrodes a1 to d1 and a2 to d2 and being superposed over lead electrodes a1 to d1 and a2 to d2 belonging to other layers in the direction of thickness, the difference in level caused by a raised lead electrode is reduced and the occurrence of delamination or cracks results in being reduced. Preferably every layer provided with a lead electrode a1 to d1 or a2 to d2 has the above-described structure.

And since dummy electrodes 51 to 58 are provided separately from an internal electrode A1 to D1 or A2 to D2, they have no influence on the electric characteristics.

Further, each of dummy electrodes 51 to 58 has one end led out to a side face to form a lead portion. The lead portion of a lead electrode a1 to d1 or a2 to d2 of each layer is superposed over the lead portion of at least one of dummy electrodes 51 to 58 belonging to another layer in the direction of thickness. Due to this, the lead portions of dummy electrodes 51 to 58 and the lead portions of lead electrodes a1 to d1 and a2 to d2 come to be respectively aligned with one another at a side of a ceramic body 1 along the direction of thickness.

Due to this, terminal electrodes formed along the direction of thickness can be connected to the lead electrodes a1 to d1 and a2 to d2 and dummy electrodes 51 to 58 aligned along the direction of thickness. The joining strength between internal electrodes A1 to D1 and A2 to D2 and terminal electrodes is increased by the joining strength between dummy electrodes 51 to 58 and terminal electrodes, and as a result the connection state is made better.

On the other hand, since a laminated ceramic capacitor disclosed in Patent Literature 2 for example has dummy electrodes not reaching an end of a ceramic body, in a capacitor having eight lead electrodes a lead electrode exposed at a side face of a ceramic body has a gap formed by seven layers in the direction of thickness and therefore is liable to make a defective connection with a terminal electrode.

And in a laminated ceramic capacitor illustrated, dummy electrodes 5 are formed on only the areas corresponding to areas where lead electrodes a1 to d1 and a2 to d2 or dummy electrodes 51 to 58 belonging to other layers are formed, being seen along the direction of thickness. Due to this, a ceramic body 1 can be firmly joined in areas where a lead electrode a1 to d1 or a2 to d2 and dummy electrodes 5 are not formed in each layer.

And since a laminated ceramic capacitor according to the present invention makes it possible to form dummy electrodes in the same process as a process of forming an internal electrode for example, it can be manufactured without making its manufacturing process complicated.

Further, a laminated ceramic capacitor according to the present invention allows auxiliary layers made of the same material as a ceramic body 1 and equal in thickness to internal electrodes A1 to D1 and A2 to D2 and dummy electrodes 51 to 58 to be provided in areas where the internal electrodes and the dummy electrodes are not provided. In this case, since the difference in level caused by raised electrodes can be more flattened in each of layers where internal electrodes A1 to D1 and A2 to D2 are formed, it is possible to more reduce the occurrence of delamination or cracks.

Table 1 shows the result of examining the occurrence ratios of delamination, crack and defective connection for 10,000 laminated ceramic capacitors according to the present invention and 10,000 comparative example laminated ceramic capacitors.

The laminated ceramic capacitor of embodiment 1 is a laminated ceramic capacitor according to the present invention shown in FIGS. 1 to 5. Comparative example 1 is different from the laminated ceramic capacitor of embodiment 1 in having no dummy electrodes. Comparative example 2 is different from the laminated ceramic capacitor of embodiment 1 in that dummy electrodes are not exposed at a side face of a ceramic body.

TABLE 1

|  | Occurrence ratio of delamination | Occurrence ratio of crack | Occurrence ratio of defective connection |
| --- | --- | --- | --- |
| Embodiment 1 | 0.2% | 0.2% | 0.1% |
| Comparative example 1 | 1.0% | 1.0% | 1.0% |
| Comparative example 2 | 0.3% | 0.3% | 0.5% |

Referring to Table 1, comparative example 1 is as very high as 1.0% in the occurrence ratios of delamination, crack and defective connection. Comparative example 2 is so high in occurrence ratio that the occurrence ratios of delamination and crack are 0.3% and the occurrence ratio of defective connection is 0.5%.

On the contrary, embodiment 1 is so sufficiently low in occurrence ratio that the occurrence ratios of delamination and crack are 0.2% and the occurrence ratio of defective connection is 0.1%. Particularly, a very low occurrence ratio of defective connection being one-fifth of comparative example 2 and one-tenth of comparative example 1 has been obtained.

Figure 6:
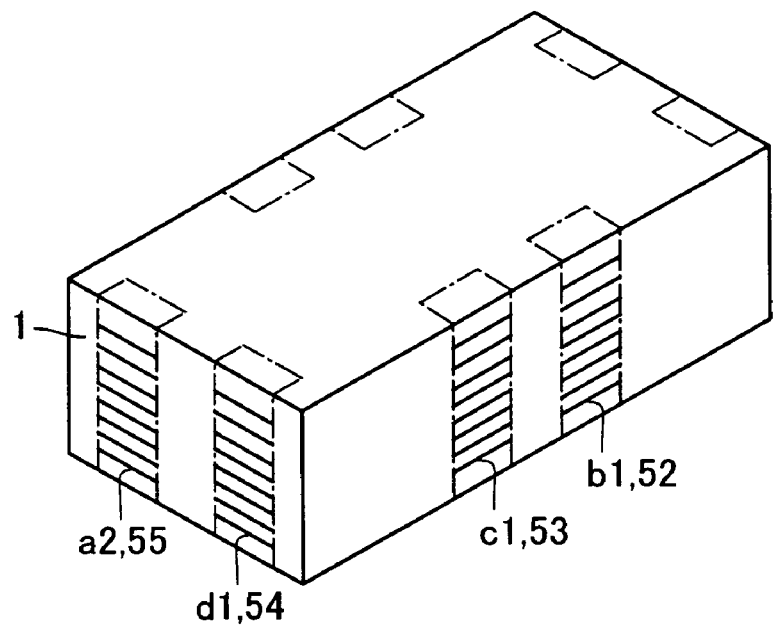
FIG. 6 is an opened-up perspective view showing another embodiment of a laminated ceramic capacitor according to the present invention.
Figure 7:
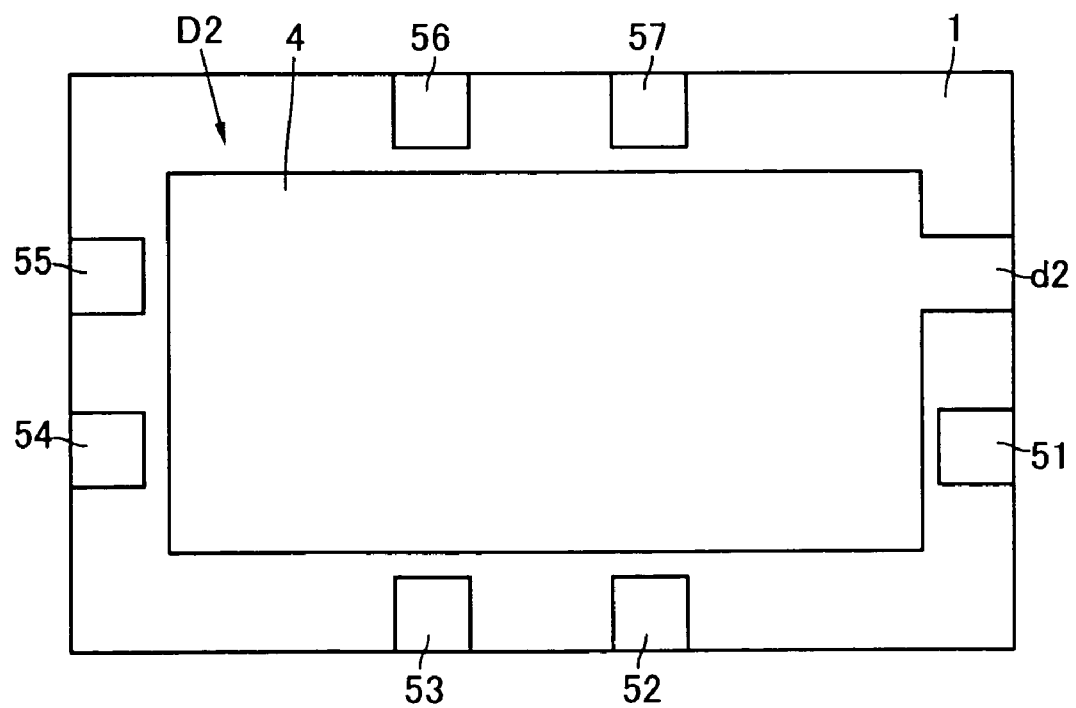
FIG. 7 is an opened-up plan view of the laminated ceramic capacitor shown in FIG. 6.

FIG. 6 is an opened-up perspective view showing another embodiment of a laminated ceramic capacitor according to the present invention, and FIG. 7 is an opened-up plan view of the laminated ceramic capacitor shown in FIG. 6. In these figures, the same components as the components shown in FIGS. 1 to 5 are given the same reference symbols and the repeated description is omitted.

In FIGS. 6 and 7, a laminated ceramic capacitor illustrated comprises internal electrodes A1 to D1 and A2 to D2 and dummy electrodes 51 to 58. The internal electrodes A1 to D1 and A2 to D2 include facing electrodes 4 and lead electrodes a1 to d1 and a2 to d2.

Lead electrodes b1 and c1 and dummy electrodes 52 and 53 are led out to the right side face, lead electrodes b2 and c2 (not illustrated) and dummy electrodes 56 and 57 are led out to the left side face, lead electrodes a1 (not illustrated) and d2 and dummy electrodes 51 and 58 (not illustrated) are led out to the rear face, and lead electrodes a2 and d1 and dummy electrodes 54 and 55 are led out to the front face.

Since the laminated ceramic capacitor illustrated has a similar structure to the laminated ceramic capacitor shown in FIGS. 1 to 5, it can provide a similar effect.

Figure 8:
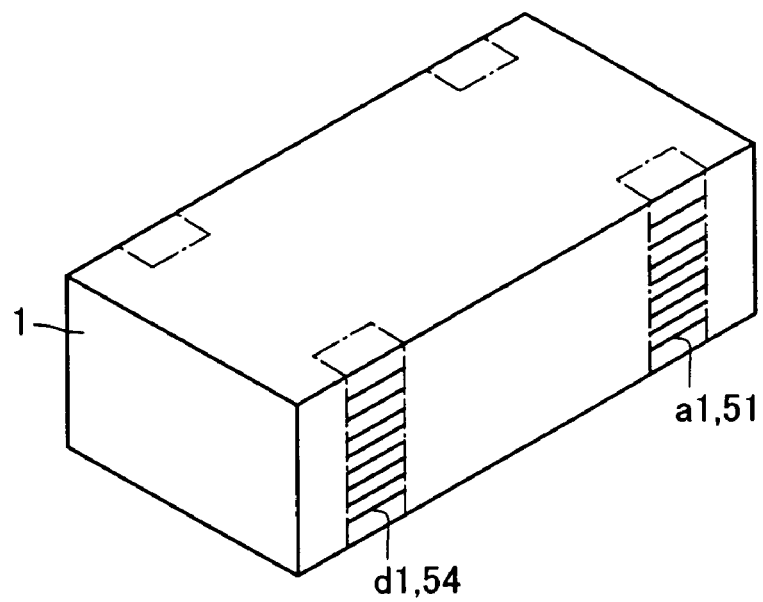
FIG. 8 is an opened-up perspective view showing further another embodiment of a laminated ceramic capacitor according to the present invention.
Figure 9:
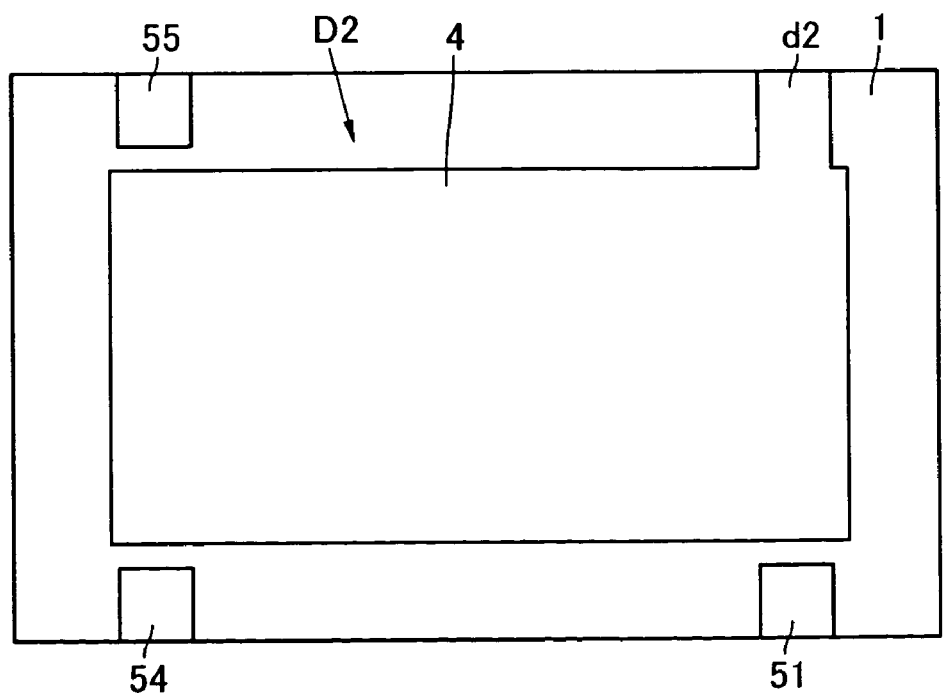
FIG. 9 is an opened-up plan view of the laminated ceramic capacitor shown in FIG. 8.

FIG. 8 is an opened-up perspective view showing further another embodiment of a laminated ceramic capacitor according to the present invention, and FIG. 9 is an opened-up plan view of the laminated ceramic capacitor shown in FIG. 8. In these figures, the same components as shown in FIGS. 1 to 7 are given the same reference symbols and the repeated description is omitted.

In FIGS. 8 and 9, the laminated ceramic capacitor illustrated comprises internal electrodes A1, D1, A2 and D2 and dummy electrodes 51, 54, 55 and 58. The internal electrodes A1, D1, A2 and D2 include lead electrodes a1, d1, a2 and d2.

The internal electrodes A1, D1, A2 and D2 are stacked one over another with ceramic body 1 between them in order of D1, A1, A2, D2, D1, A1, A2 and D2 from below. Lead electrodes a1 and d1 and dummy electrodes 51 and 54 are led out to the right side face, and lead electrodes a2 (not illustrated) and d2 and dummy electrodes 55 and 58 (not illustrated) are led out to the left side face.

Since the laminated ceramic capacitor illustrated has a similar structure to the laminated ceramic capacitor shown in FIGS. 1 to 7, it can provide a similar effect.

Figure 10:
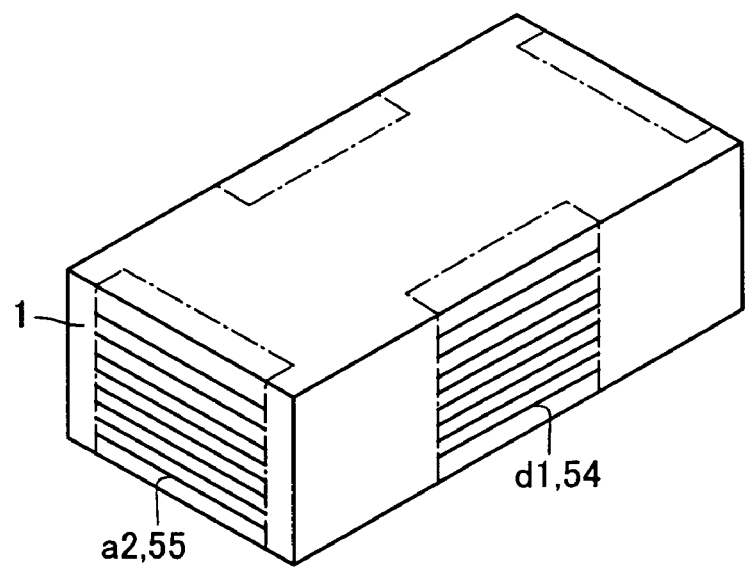
FIG. 10 is an opened-up perspective view showing still another embodiment of a laminated ceramic capacitor according to the present invention.
Figure 11:
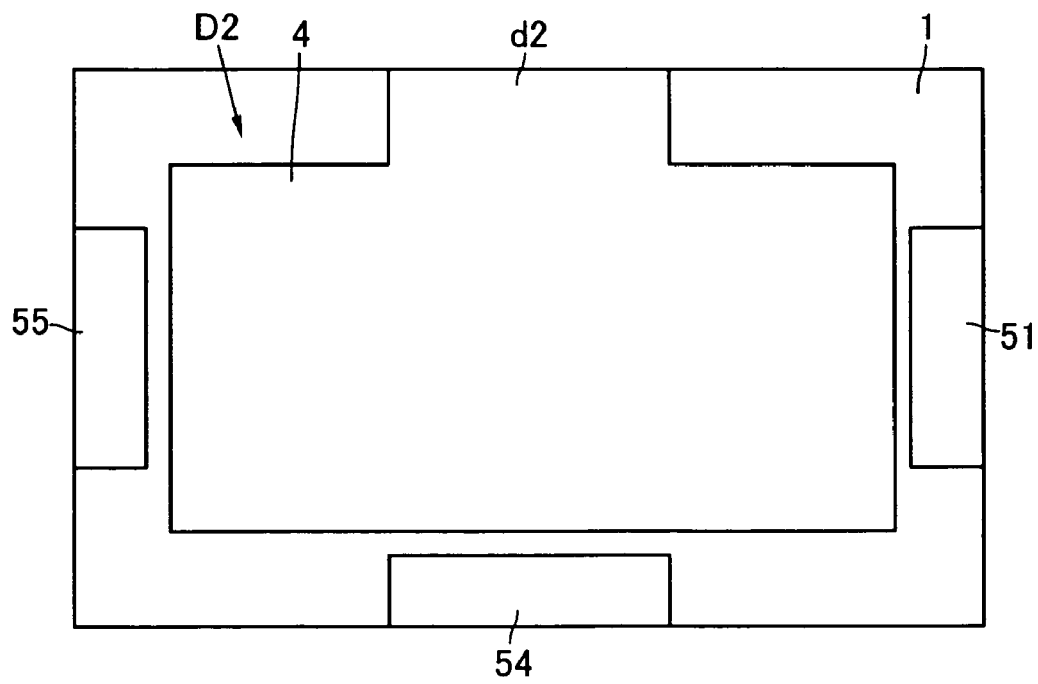
FIG. 11 is an opened-up plan view of the laminated ceramic capacitor shown in FIG. 10.

FIG. 10 is an opened-up perspective view showing still another embodiment of a laminated ceramic capacitor according to the present invention, and FIG. 11 is an opened-up plan view of the laminated ceramic capacitor shown in FIG. 10. In these figures, the same components as shown in FIGS. 1 to 9 are given the same reference symbols and the repeated description is omitted.

In FIGS. 10 and 11, the laminated ceramic capacitor illustrated comprises internal electrodes A1, D1, A2 and D2 and dummy electrodes 51, 54, 55 and 58. The internal electrodes A1, D1, A2 and D2 are stacked one over another with ceramic body 1 between them in order of D1, A1, A2, D2, D1, A1, A2 and D2 from below.

Lead electrode d1 and dummy electrode 54 are led out to the right side face, lead electrodes a2 and dummy electrode 55 are led out to the front face, lead electrode d2 and dummy electrode 58 (not illustrated) are led out to the left side face, and lead electrodes a1 (not illustrated) and dummy electrode 51 are led out to the rear face.

Since the laminated ceramic capacitor illustrated has a similar structure to the laminated ceramic capacitor shown in FIGS. 1 to 9, it can provide a similar effect.

Next, a method for manufacturing a laminated ceramic capacitor shown in FIGS. 1 to 5 is described with reference to FIGS. 12 to 14.

Figure 12:
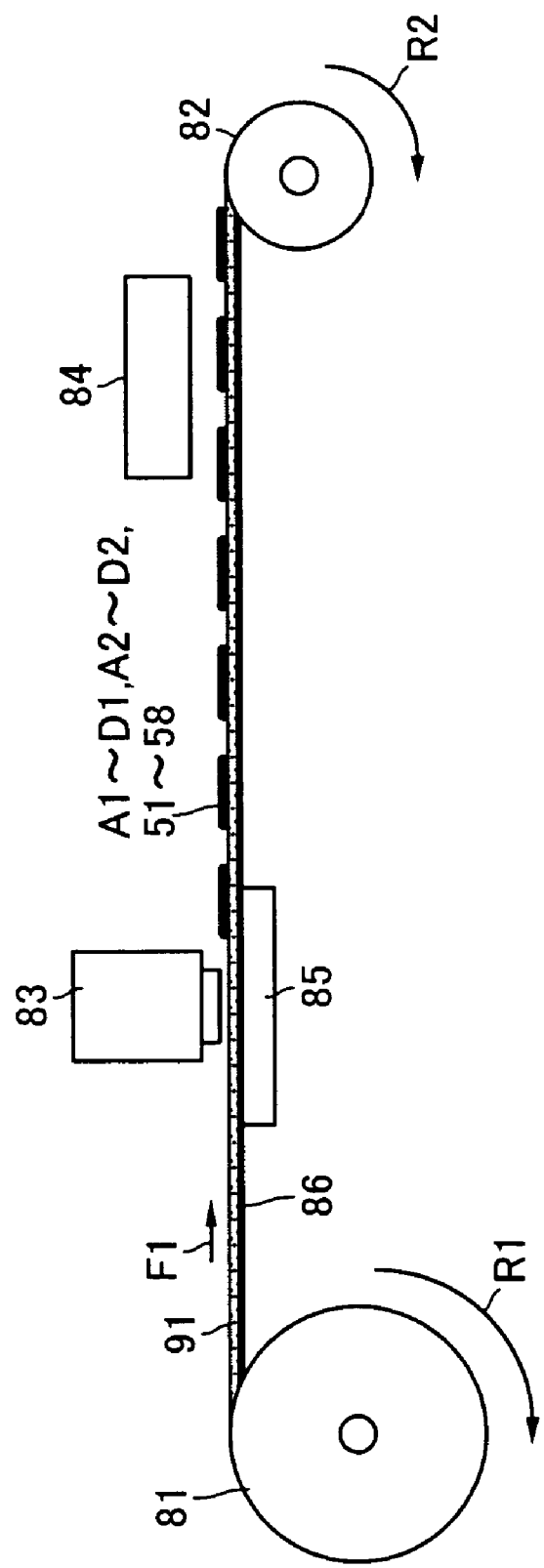
FIG. 12 is a figure for explaining a method for manufacturing a laminated ceramic capacitor according to the present invention.

First, in FIG. 12 a feed roll 81 rotates in the direction of arrow R1 and a take-up roll 82 rotates in the direction of arrow R2. A belt-shaped support 86 is stretched between the feed roll 81 and the take-up roll 82. The support 86 is formed out of a flexible plastic film for example and carries a ceramic green sheet 91 in the direction of arrow F1.

A printing device 83 and a receiving stand 85 print internal electrodes A1 to D1 and A2 to D2 and dummy electrodes 51 to 58 onto the ceramic green sheet 91. The printing can use screen printing, gravure printing, offset printing and the like.

Figure 13:
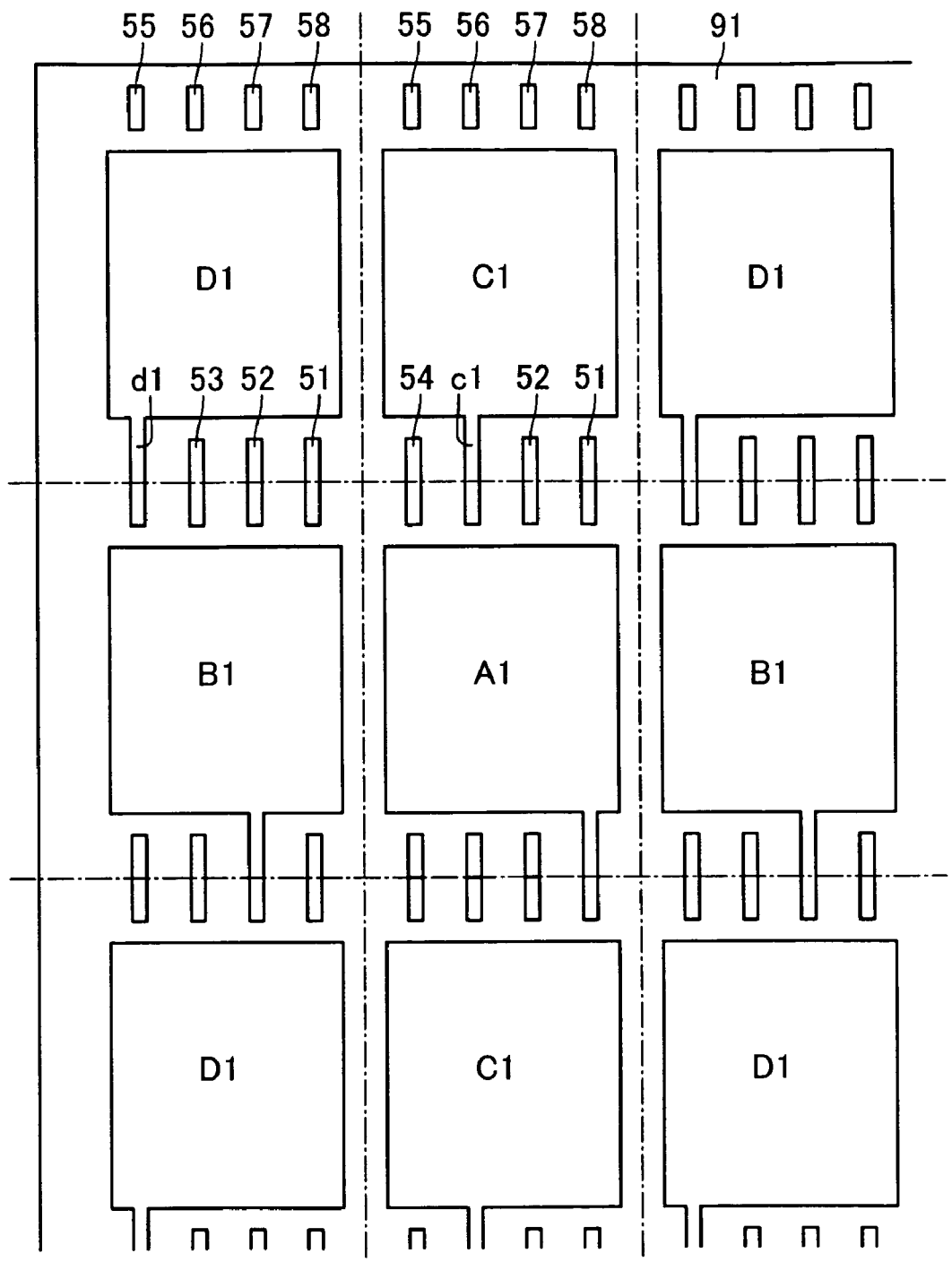
FIG. 13 is another figure for explaining a method for manufacturing a laminated ceramic capacitor according to the present invention.

FIG. 13 shows internal electrodes A1 to D1 and dummy electrodes 51 to 58 printed by the printing device 83. In the figure, in the ceramic green sheet 91, dummy electrodes 51 to 58 and internal electrodes A1 (A2) and B1 (B2) are repeatedly printed on odd lines, and dummy electrodes 51 to 58 and internal electrodes C1 (C2) and D1 (D2) are repeatedly printed on even lines. The internal electrodes A2 to D2 are obtained by turning the internal electrodes A1 to D1 by 180 degrees.

In FIG. 12 again, a ceramic green sheet 91 having electrodes printed on it goes through a drying process performed by a drying device 84 and is taken up by the take-up roll 82.

Figure 14:
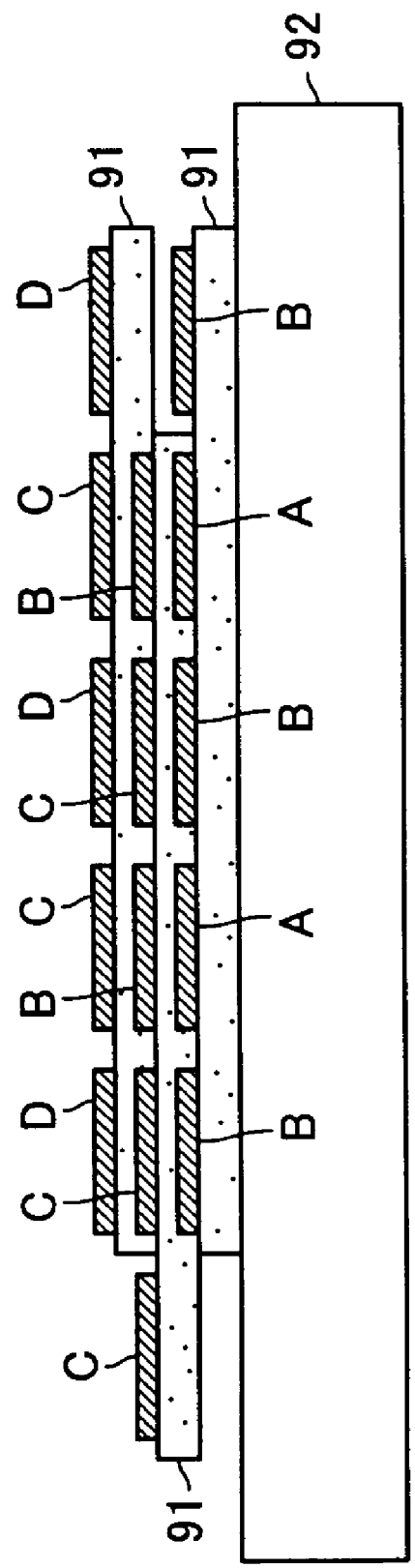
FIG. 14 is still another figure for explaining a method for manufacturing a laminated ceramic capacitor according to the present invention.

Next, as shown in FIG. 14, the ceramic green sheet 91 taken up by the take-up roll 82 is blanked out into a specified size and the pieces of ceramic green sheet obtained by the blanking process are stacked one over another on a stacking stand 92. In the figure, reference symbol A shows an internal electrode A1 or A2, reference symbol B shows an internal electrode B1 or B2, reference symbol C shows an internal electrode C1 or C2, and reference symbol D shows an internal electrode D1 or D2.

Figure 1:
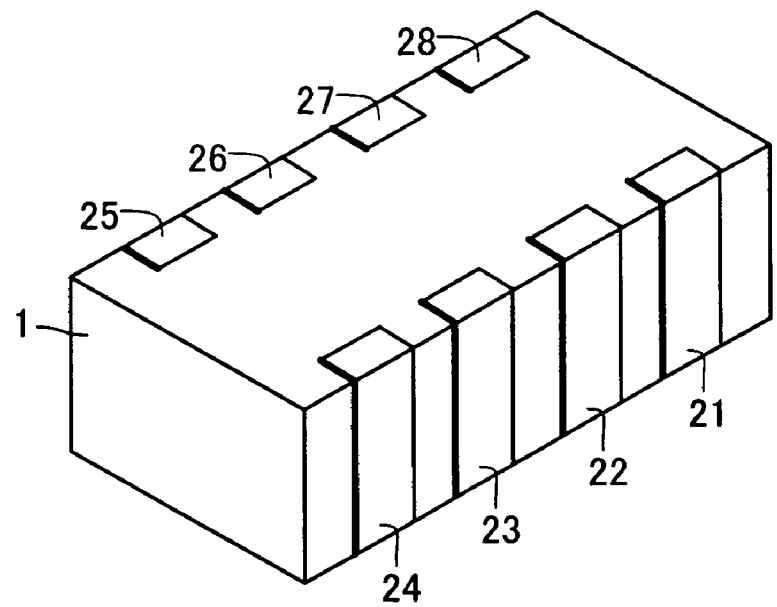
FIG. 1 is an external perspective view showing an embodiment of a laminated ceramic capacitor according to the present invention.
Figure 2:
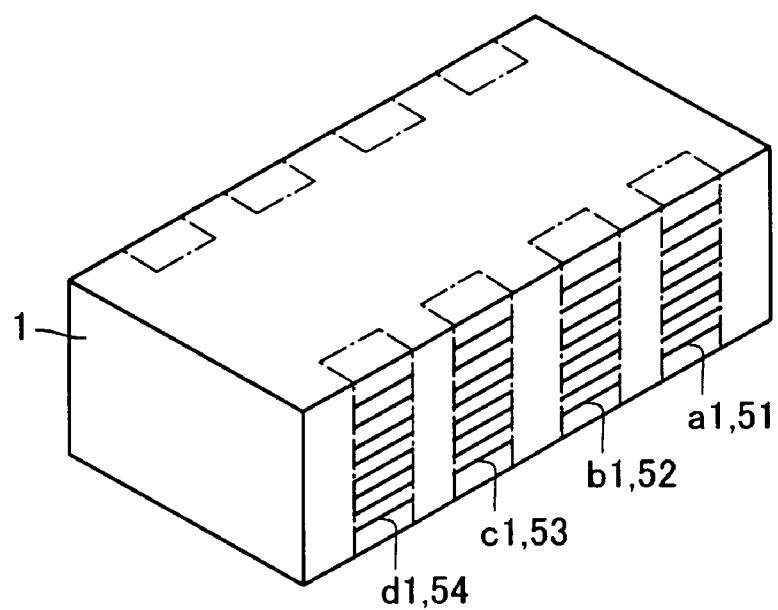
FIG. 2 is an opened-up perspective view showing the laminated ceramic capacitor shown in FIG. 1.

The stacked ceramic green sheet 91 is cut between the internal electrodes A1 to D1 and A2 to D2, is baked, and is given terminal electrodes 21 to 28 (see FIG. 1) to form a laminated ceramic capacitor shown in FIG. 1.

As shown in FIGS. 13 and 14, in the manufacturing method, the internal electrodes A1, B1, C1 and D1 are patterned on one prepress. Accordingly, by offsetting pattern of the prepress, the internal electrodes A1, B1, C1, D1, A2, B2, C2 and D2 are laminated in above order and a laminated object is provided. Therefore, it is possible to simplify the manufacturing process and easily manufacture a capacitor.

And the manufacturing method illustrated can form dummy electrodes 51 to 58 in the same process as a process of forming internal electrodes A1 to D1 and A2 to D2. Due to this, it is possible to simplify the manufacturing process and easily manufacture a capacitor.

As described above, although the contents of the present invention have been concretely described with reference to the preferred embodiments, it is self-evident to the people in this technical field to be capable of taking various variations on the basis of the basic technical idea and teachings of the present invention.

What is claimed is:

1. A laminated ceramic capacitor comprising;

a ceramic body;

internal electrodes; and dummy electrodes;

wherein;

said internal electrodes are plural in number, each include a facing electrode and a lead electrode, and are laid in layers at spaces in the direction of thickness of said ceramic body, said facing electrode is an electrode for acquiring a capacitance, said lead electrode has one end connected to said facing electrode and the other end led out to a side face of said ceramic body to form a lead portion, said dummy electrodes are separated from said corresponding facing electrode in each respective layer and have one end led out to said side face to form a lead portion, and said lead portion of the lead electrode of each layer is superposed over said lead portion of a dummy electrode belonging to another layer in the direction of thickness.

2. A laminated ceramic capacitor according to claim 1, wherein;

in each layer, at least one of said dummy electrodes is led out to said side face where said lead electrode is led out.

3. A laminated ceramic capacitor according to claim 1, wherein;

in each layer, said dummy electrodes are led out to only said side face where said lead electrode is not led out.

4. A laminated ceramic capacitor according to claim 1, wherein;

in each layer, said dummy electrodes include a dummy electrode led out to said side face where said lead electrode is led out and a dummy electrode led out to said side face where said lead electrode is not led out.

5. A laminated ceramic capacitor according to claim 1, wherein;

said lead electrodes are led out to a pair of opposite side faces of said ceramic body.

6. A laminated ceramic capacitor according to claim 1, wherein;

said lead electrodes are led out to a pair of opposite side faces of said ceramic body and another pair of opposite side faces perpendicular to said opposite side faces.

7. A laminated ceramic capacitor according to claim 1, wherein;

said lead electrodes are led out at a plurality of locations on a side face of said ceramic body.

8. A laminated ceramic capacitor according to claim 7, wherein;

said lead electrodes led out at a plurality of locations on a side face of said ceramic body are superposed one over another in the direction of thickness of said ceramic body.

9. A laminated ceramic capacitor according to claim 1, wherein;

said dummy electrode corresponds in width to said lead electrode.

10. A laminated ceramic capacitor according to claim 1, comprising a plurality of terminal pairs.

* * * * *